Oct. 3, 1950     O. R. BRINEY, JR     2,524,374
CUTTING TOOL
Filed Oct. 6, 1948
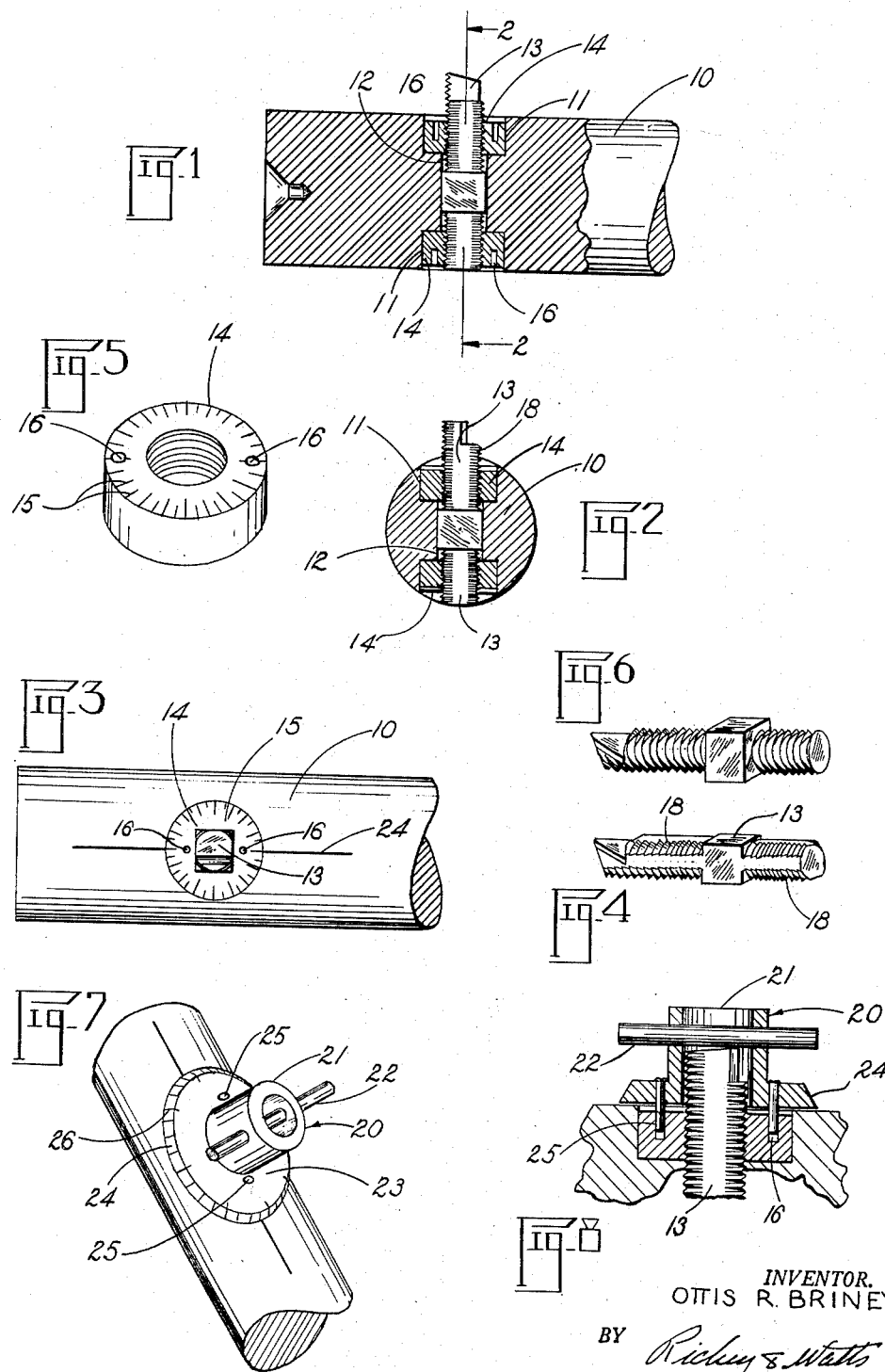
INVENTOR.
OTTIS R. BRINEY, JR.
BY Richey & Watts
ATTORNEYS Patented Oct. 3, 1950

2,524,374

UNITED STATES PATENT OFFICE 2,524,374

CUTTING TOOL

Ottis R. Briney, Jr., Pontiac, Mich., assignor of one-half to James W. Briney

Application October 6, 1948, Serial No. 52,999

3 Claims. (Cl. 77—56)

This invention relates to improvements in boring bars and the cutting tool used in conjunction therewith.

One of the objects of the invention is to provide a cutting tool which is designed to accommodate the construction thereof from a hardened prismoidal bar of the type commonly known as a lathe tool bit.

Another object of the invention is to provide a cutter-supporting structure which is formed to facilitate axial adjustments of the tool and assure the rigid securement thereof.

Another object of the invention is to provide a pin wrench having graduations on an enlarged flange thereof adapted for use with boring bar markings to indicate the rotational movement of the cutting tool nuts during adjustment thereof.

Further objects of the invention reside in the provision of a boring bar and cutter assembly which is economic of manufacture, sturdy of structure, susceptible of diversified uses, and constructed to withstand the vibratory reactions normally imposed upon a tool of this type.

Other objects and advantages more or less ancillary to the foregoing, and the manner in which all the various objects are realized, will appear in the following description, which, considered in connection with the accompanying drawings, sets forth the preferred embodiment of the invention.

Referring to the drawings:

Fig. 1 is a longitudinal section through the improved boring bar and cutter therefor;

Fig. 2 is a transverse section through the bar, the section being taken on a plane indicated by the line 2—2 in Fig. 1;

Fig. 3 is an elevation of the bar showing an end view of the cutting tool;

Fig. 4 is a view in perspective of the improved cutter;

Fig. 5 is a view in perspective of one of the lock nuts;

Fig. 6 is a view in perspective of an alternate form of the cutter;

Fig. 7 is a view in perspective of a fragmentary portion of the bar and the wrench for adjusting the lock nuts; and Fig. 8 is a vertical sectional view through the bar and wrench.

As illustrated in Figs. 1 and 2, the boring bar or tool holder 10 is formed with a cross bore 11 therein having the central portion 12 thereof broached in configuration of the transverse section of the tool bit or cutter 13. Each end of the bore 11 is counterbored to form a seat for the reception of an internally threaded collar or nut 14, which is preferably provided with graduations 15 on the face thereof to guide the operator in making longitudinal adjustments of the cutter. The nuts 14 are machined for snug engagement within the counterbores, and are drilled and tapped for the reception of the threaded body of the tool bit. The outer faces of the nuts are formed with shallow openings 16 to receive a pin wrench or similar tool for locking the parts in tightened relation against their seats. The nuts may be of equal thickness unless the cutter 13 protrudes an appreciable amount beyond the bar, in which case the nut adjacent the cutting edge of the tool may be of a greater thickness in order to minimize vibration and lateral strain upon the tool.

The cutting tool is preferably formed from a tool bit such as commonly employed in turning operations in a lathe, or, if desired, may be formed from a prismoidal bar of an alloy of cobalt, carbon and tungsten such as Carboloy or a bar of low carbon steel having a hardened alloy tip thereon. The corners of the end portions of the tool bit are formed with ground threads 18 therein engageable respectively with the tapped openings in the nuts 14. The sides of the central portion of the bit may be surface ground, if necessary, to assure the snug engagement thereof within the broached hole 12 in the boring bar. As an alternate form of production, the ends of the cutting tool may be ground in cylindrical form as shown in Fig. 6, then thread-ground as in the former case. The protruding end of the tool is ground in the customary manner to form the requisite rake and clearance.

The wrench 20 as shown in Figs. 7 and 8 comprises a hollow stem 21 cross-drilled for a bar or handle 22 and formed with a diametrically enlarged flange 23 having a beveled circumferential edge 24. The lower face of the flange is provided with pieces 25 spaced for engagement in the openings 16 in the nuts. The beveled edge of the flange is inscribed with divisional markings 26 calibrated with respect to the threads in the nuts to show in thousandths of an inch the longitudinal movement or feed of the tool. The flange is of a suitable diameter to facilitate graduations of approximately one-quarter inch per one-thousandths of an inch feed.

In operation, the cutting tool is inserted in the bar with the square or polygonal section thereof engaged with the broached hole 12. A nut is next threaded on the portion of the cutter adjacent the cutting edge thereof and adjusted into seated position, with the cutter projecting the desired radial distance beyond the bar. The second nut is then threaded on the opposed end of the cutter, and drawn into seated engagement with the end wall of the counterbore. The graduations on the face of the cone may be referred to in reference to longitudinal scribed lines 24 on the opposed faces of the bar, when a pin wrench of conventional form is used, or reference may be had to the graduations on the wrench shown in Figs. 7 and 8, wherein the tool is initially positioned or reset after grinding.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A boring tool comprising a bar having a transverse opening therein defining bearing seats and a central portion of square transverse section, a cutting tool in said opening formed with threaded end sections and a central portion of square transverse section, and means engaged with said seats and threaded on the end sections of said cutting tool for the support thereof.

2. A boring tool comprising a bar having a square transverse opening therein, a tool bit of square cross-section in said opening, threads machined in the opposed ends of the tool bit, and nuts on the threaded portion of the tool bit engaged with the bar.

3. A boring tool comprising a bar having a rectangular hole therein and circular counterbores adjacent the ends of the hole, a tool bit of rectangular cross-section in said hole, threads ground in the end portions of said tool bit, and cylindrical nuts on the opposed ends of said tool bit snugly engaged in said circular counterbores.

OTTIS R. BRINEY, JR.

REFERENCES CITED

The following references are of record in the file of this patent:

UNITED STATES PATENTS

| Number | Name | Date |
|---|---|---|
| 1,097,096 | Heuerman et al. | May 19, 1914 |
| 1,374,715 | Bernay | Apr. 12, 1921 |
| 1,423,209 | Gibbs | July 18, 1922 |
| 2,330,692 | De Vlieg | Sept. 28, 1943 |